US007738404B2

(12) United States Patent
Deb et al.

(10) Patent No.: US 7,738,404 B2
(45) Date of Patent: Jun. 15, 2010

(54) METHOD OF AGGREGATE STATISTIC COMPUTATION

(75) Inventors: Supratim Deb, Bangalore (IN); Srinivas Kashyap, Greenbelt, MD (US); Naidu K V M, Bangalore (IN); Rajeev Rastogi, Bangalore (IN); Anand Srinivasan, Bangalore (IN)

(73) Assignee: Alcatel-Lucent USA Inc., Murray Hill, NJ (US)

(*) Notice: Subject to any disclaimer, the term of this patent is extended or adjusted under 35 U.S.C. 154(b) by 411 days.

(21) Appl. No.: 11/656,465

(22) Filed: Jan. 23, 2007

(65) Prior Publication Data

US 2008/0175169 A1 Jul. 24, 2008

(51) Int. Cl.
*H04L 12/28* (2006.01)

(52) U.S. Cl. ........................ 370/255; 370/254; 370/336; 370/338; 709/208; 709/209; 709/211

(58) Field of Classification Search .......... 370/241.235, 370/238, 256, 396, 408, 235, 241, 338, 403, 370/425, 445; 709/208–211, 233, 201, 224, 709/225, 226, 230; 707/3, 10, 205
See application file for complete search history.

(56) References Cited

U.S. PATENT DOCUMENTS 5,944,793 A * 8/1999 Islam et al. ................ 709/220
7,461,130 B1 * 12/2008 AbdelAziz et al. .......... 709/208
2003/0202468 A1 * 10/2003 Cain et al. .................. 370/229
2004/0132448 A1 * 7/2004 Torres et al. ................ 455/427
2004/0234045 A1 * 11/2004 Hora et al. ............... 379/88.13
2006/0034281 A1 * 2/2006 Cain et al. .................. 370/390
2007/0263545 A1 * 11/2007 Foster et al. ................ 370/241

* cited by examiner

*Primary Examiner*—Pankaj Kumar
*Assistant Examiner*—Anez Ebrahim
(74) *Attorney, Agent, or Firm*—Harness, Dickey & Pierce

(57) ABSTRACT

A method of grouping nodes within a distributed network is provided. The example method includes performing a leader node self determination operation by which each node within the distributed network determines whether to become a leader node or a non-leader node, each leader node being the leader of a group including at least one node. Next, requests are sent, from each leader node, requesting at least one non-leader node to join the group associated with the leader node. First received requests are accepted, at each non-leader node, such that accepting non-leader nodes transition from a non-leader node to a dependent node dependent upon the requesting leader node. A next set of requests are sent, from each remaining non-leader node, requesting to join the group associated with at least one leader node. A determination is made, at each requested leader node, as to whether to accept the non-leader node into the group associated with the requested leader node. Based on the determination, at each requested leader node, the non-leader node is either accepted into the group associated with the requested leader node, or is alternatively rejected from the group.

16 Claims, 13 Drawing Sheets

AVERAGE
(CONVENTIONAL ART)

MAX

"PUSH"

"PUSH"
(LEADER)
FROM S415 OF FIGURE 4
INITIALIZE ROUND COUNTER
S500
SELECT RANDOM NODE
S503
SEND GROUP JOIN REQUEST
S505
ACCEPTED?
S510
N
Y
ADD TO GROUP
S515
EXCHANGE VALUES
S520
INCREMENT ROUND COUNTER
S525
REPEAT?
S530
Y
N
DONE
S535

"PUSH"
(NON-LEADER)
FROM S415 OF FIGURE 4
INITIALIZE ROUND COUNTER
S600
ONE OR MORE REQUESTS RECEIVED IN ROUND?
S602
N
S604
INCREMENT ROUND COUNTER
Y
REPEAT?
S606
N
Y
SELECT ONE OF THE REQUESTS
S608
JOIN GROUP OF LEADER NODE SENDING SELECTED REQUEST
S610
EXCHANGE VALUES
S615
IGNORE FURTHER REQUESTS
S620
DONE
S625

"PULL"
(UNASSIGNED)
INITIALIZE ROUND COUNTER
S700
CALL RANDOM NODE
S705
S715
ACCEPTED?
N
Y
REACH LEADER NODE?
S710
S720
Y
JOIN GROUP
INCREMENT ROUND COUNTER
S745
N
S730
CALL LEADER
REACH DEPENDENT?
Y
EXCHANGE VALUES
S740
S725
N
INCREMENT ROUND COUNTER
S750
S755
REPEAT?
Y
N
S760
DONE

"PULL"
(LEADER)
S800
INITIALIZE ROUND COUNTER AND ACCEPTANCE COUNTER
S805
RECEIVE CALL?
N
Y
S810
ACCEPT?
N
Y
S835
IGNORE INCOMING CALLS
S815
ADD TO GROUP
S817
INCREMENT ACCEPTANCE COUNTER
S820
EXCHANGE VALUES
INCREMENT ROUND COUNTER
S825
S830
REPEAT?
Y
N
S840
DONE

"GOSSIP"
(LEADER)
S900
INITIALIZE ROUND COUNTER
S905
CALL NODE AT RANDOM
S910
REACH LEADER?
Y
N
S925
ACQUIRE LEADER ADDRESS
EXCHANGE VALUES
S915
S930
CALL LEADER
S920
INCREMENT ROUND COUNTER
S935
REPEAT?
Y
N
S940
DONE

"SAMPLING" FIGURE 10

AVERAGE

SUM

RANK

METHOD OF AGGREGATE STATISTIC COMPUTATION

BACKGROUND OF THE INVENTION

1. Field of the Invention

Example embodiments of the present invention relate generally to a method of computing aggregate statistics within a distributed network.

2. Description of the Related Art

Many large-scale distributed applications require aggregate statistics (e.g., MIN, MAX, SUM, RANK, AVERAGE, etc.) to be computed based on data stored at individual nodes. For example, in peer-to-peer (P2P) systems, the average number of files stored at each peer node or the maximum size of files exchanged between nodes can be an important factor for system designers attempting to optimize overall system performance.

Similarly, in sensor networks, disseminating individual readings of temperature or humidity among a plurality of sensor nodes, besides being very expensive, may also be unnecessary, and aggregates like MAX (e.g., a maximum temperature from the plurality of sensor nodes) or AVERAGE (e.g., an average temperature from the plurality of sensor nodes) may be sufficient in most cases.

In another example, in a wireless network monitoring application deploying software probes on mobile handsets to monitor performance, a service provider may be more interested in abnormal measurements recorded by the probes, such as unusually low signal strength or atypically high application response times.

Three important design criteria for aggregate computations are scaling, robustness and communication overhead. Scaling means that the aggregation computation procedure may scale to a large number of nodes (e.g., without prohibitive costs, complexity, resource allocation, etc.). For example, P2P systems and sensor networks may include millions of participating nodes (e.g., distributed throughout the Internet). Accordingly, scaling may refer to how computation times are affected as new nodes join. For example, an aggregate computation procedure with good scaling characteristics may be associated with a linear increase in computation times (e.g., as opposed to an exponential increase) as new nodes are added to the system. Robustness relates to how accurate the aggregate computation remains in the presence of failures at one or more nodes within the system. For example, link and node reliability may be expected to be poor in wireless networks as compared to wired networks. Communication overhead is the signaling or messaging associated with computing the aggregate statistic. For example, wireless communication systems (e.g., IEEE 802.11, Bluetooth, CDMA, OFDMA, GSM, UMTS, etc.) typically have lower bandwidths than wired communication systems, and in wireless sensor networks, nodes have limited battery lives (e.g., which are drained by messaging, searching to establish a connection, etc.).

Accordingly, in order to facilitate computations for aggregate statistics, system designers typically attempt to develop a solution which scales as nodes are added, is robust in the presence of failures and incurs a relatively low communication overhead. However, system designers typically make decisions which "trade-off" between scaling, robustness and communication overhead.

In a conventional centralized aggregate statistic computation process, each of a plurality of nodes within a system (e.g., a P2P system, a sensor system, a wireless system, etc.) transmits a value, to be collected and used in the aggregate statistic computation along with values from other of the plurality of nodes, to a central coordinator. The central coordinator collects the transmitted values and computes the aggregate. The conventional centralized approach is relatively efficient in terms of communication overhead because, assuming n nodes take part in the aggregate statistic computation (i.e., not counting the central coordinator), only n messages require transmission to compute the aggregate statistic. However, the centralized approach is weak in terms of scalability and reliability because the central coordinator may fail (e.g., low robustness) and/or become a bottleneck (e.g., low scalability as more nodes are added).

In a conventional decentralized gossip-based aggregate statistic computation process, each of a plurality of nodes within a system (e.g., a P2P system, a sensor system, a wireless system, etc.) exchanges information with a randomly-selected node within the system during each "round" of the computation process (e.g., a round may be a period of time required to exchange the information used in the computation process). It will be readily appreciated by one of ordinary skill in the art that a gossip-based aggregate statistic computation process has advantages with regard to robustness (e.g., because message failures and/or node failures may be compensated by the random-communication) and scalability as compared to the conventional centralized approach.

FIG. 1 illustrates a conventional decentralized gossip-based aggregate statistic computation process for computing an aggregate AVERAGE. The process of FIG. 1 is performed at each of a plurality of nodes within a system (e.g., a P2P system, a sensor system, a wireless system, etc.), and will hereinafter be described as being performed at a representative Node X. Further, the plurality of nodes will hereinafter be described as including n nodes, where n is a positive integer greater than or equal to 2. The process of FIG. 1 illustrates one "round" of computation, wherein multiple rounds, or iterations, of the process of FIG. 1 are performed at each of the n nodes to compute the aggregate statistic.

In step S100 of FIG. 1, Node X selects one of the n nodes with a well-known random selection algorithm. Node X sends half of a local value to the randomly selected node in step S105. The local value corresponds to the aggregate statistic being computed with the conventional decentralized gossip-based aggregate statistic computation process of FIG. 1. For example, if the aggregate statistic is an average temperature at a plurality of temperature sensors distributed throughout a Heating, Ventilation and Air Conditioning (HVAC) system, the local value referred to in step S105 is the temperature at Node X.

In step S110, the randomly selected node receives half of the local value sent from the Node X. The randomly selected node adds the received value from Node X to half of its own local value in step S115. Thus, a resultant summed value is halfway between previous local values stored at the randomly selected node and the Node x, respectively.

The process of FIG. 1 may be reconfigured to compute other aggregate statistics. For example, each node may send the full amount of its local value to a randomly selected node, and the receiving node may replace its own local value if the received value is lower for MIN, or higher for MAX.

As discussed above, while the process of FIG. 1 is described as performed at Node X and the randomly selected node, the process of FIG. 1 is, in actuality, performed at all n nodes at the same time during each "round". The process of FIG. 1 repeats a number of times until, statistically, there is a high probability that all n nodes have converged to an approximation of the true, aggregate statistic.

Recent statistical studies have shown that the process of FIG. 1 converges to "true" aggregate statistics at each of the n nodes in (log n) rounds, or iterations, of the process of FIG. 1. Also, because the process of FIG. 1 is performed at each of the n nodes during each round, n multiplied by (log n), or (n log n), messages are sent during the iterative process of FIG. 1.

As discussed above, it is generally undisputed that the conventional decentralized gossip-based aggregate statistic computation process, described above with respect to FIG. 1, is sufficiently robust to handle a reasonable number of node failures throughout the system. Further, (log n) (i.e., a number of rounds to converge to the aggregate statistic) serves as a scalability indicator and (n log n) (i.e., a number of messages throughout the (log n) rounds) serves as a communication overhead indicator for the conventional decentralized gossip-based aggregate statistic computation process.

SUMMARY OF THE INVENTION

An example embodiment of the present invention is directed to a method of grouping nodes within a distributed network, including performing a leader node self determination operation by which each node within the distributed network determines whether to become a leader node or a non-leader node, each leader node being the leader of a group including at least one node, sending requests, from each leader node, requesting at least one non-leader node to join the group associated with the leader node, accepting, at each non-leader node, a request from a first requesting leader node, such that accepting non-leader nodes transition from a non-leader node to a dependent node dependent upon the requesting leader node, sending requests, from each remaining non-leader node, requesting to join the group associated with at least one leader node, determining, at each requested leader node, whether to accept the non-leader node into the group associated with the requested leader node and accepting, at each requested leader node, the non-leader node into the group associated with the requested leader node based on the determining step.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS

In order to better understand the present invention, an example communication system will be described, followed by aggregate statistic computation processes performed within the example communication system according to example embodiments of the present invention.

System Assumptions

Figure 1:
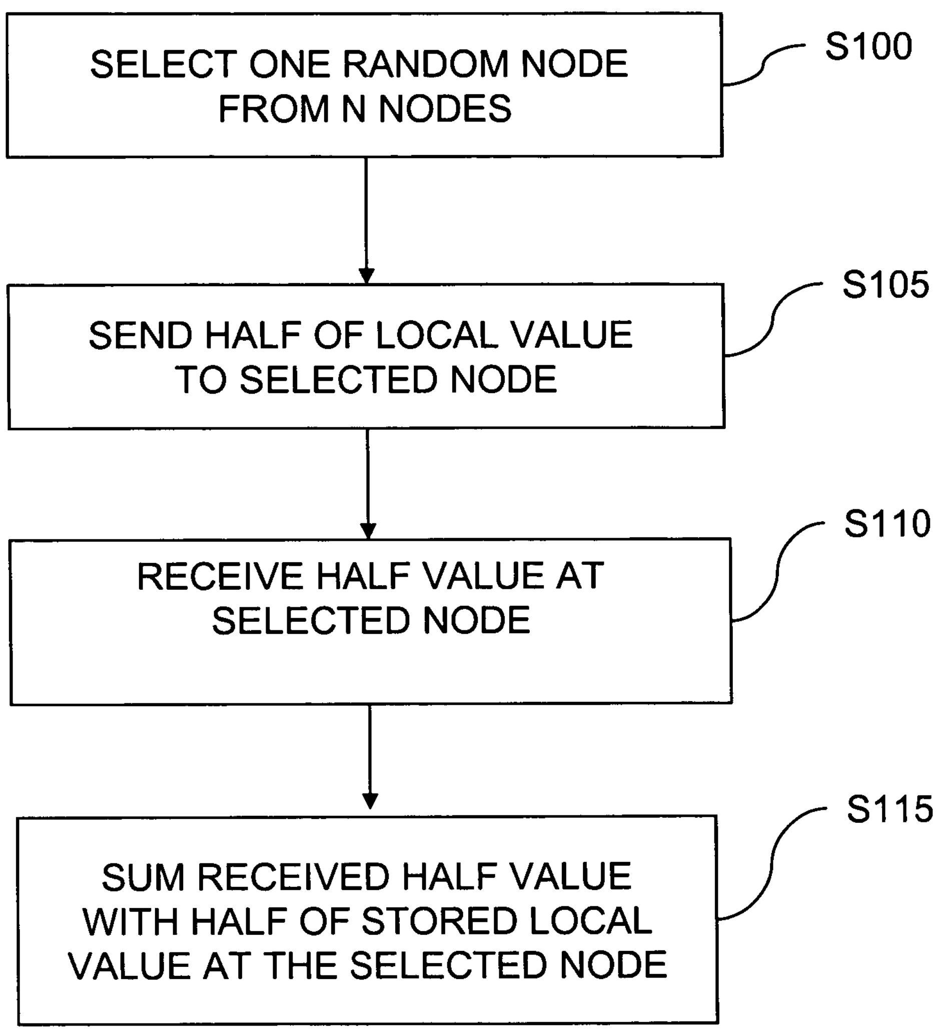
FIG. 1 illustrates a conventional decentralized gossip-based aggregate statistic computation process for computing an aggregate AVERAGE.
Figure 2:
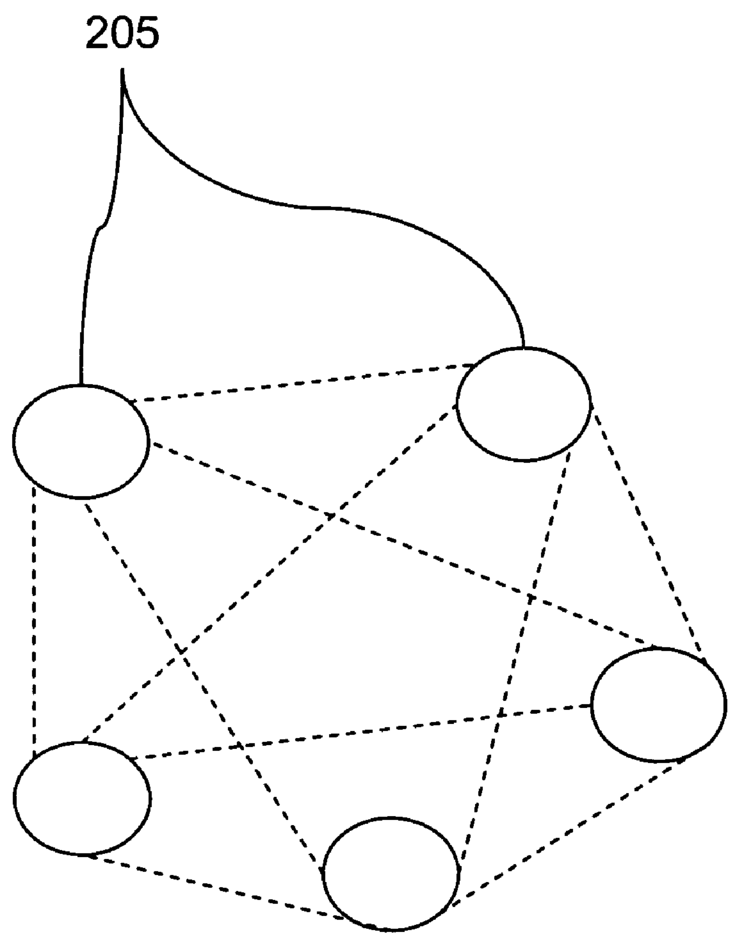
FIG. 2 illustrates a communication system according to an example embodiment of the present invention.

FIG. 2 illustrates a communication system 200 according to an example embodiment of the present invention. In the example embodiment of FIG. 2, the system 200 may include a plurality of nodes 205. The plurality of nodes 205 may number n, wherein n is an integer greater than or equal to 2. Each of the plurality of nodes 205 stores one or more local values, referred to as val(i) wherein i is an ith node among the n nodes 205. In an example, the local value val(i) may represent temperature measured by temperature sensing equipment at the ith node.

Each of the n nodes 205 may communicate with any other n node 205 in time partitions hereinafter referred to as "rounds". It is assumed that rounds for each of the n nodes 205 are synchronized, and that each of the n nodes 205 may communicate during the same round. The n nodes 205 are restricted based upon a type of communication performed in each round. Thus, each of the n nodes 205 may transmit information to only one other node 205 in any given round, and each of the n nodes 205 may receive information from only one other node 205 in any given round. Each of the n nodes 205 may transmit and receive information in the same round. For example, two nodes 205 may "exchange" their local values during the same round. Further, each of the n nodes 205 may receive multiple requests from other nodes 205 to transfer (e.g., transmit or receive) information, but may only send and/or receive local values to/from a single node during each round. In an example, if a requested node receives two requests to exchange local values in the same round, the requested node may approve or select one of the two requests and exchange values with only one of the requesting nodes. The non-approved node is added to a queue (e.g., a first-in first-out (FIFO) queue) for the requested node, such that, at a next round, the non-approved node is selected/approved by the requested node (e.g., or moved to a higher position in the queue if the queue includes additional waiting nodes). Alternatively, if a number of nodes in the requested node's queue is above a queue threshold, the non-approved node's request is simply ignored.

If one of the nodes 205 requests access to either send or receive data to/from a target node, the node 205 is said to "call" the target node. If the target node approves the call, the node 205 and the target node may exchange values. Both the call and the subsequent value exchange are assumed to be contained within a single round (e.g., unless the call is non-approved and the requesting node is added to the target node's queue).

Information exchanged within any given round is bounded by a bit transfer threshold. In an example, the bit transfer threshold is (log n+log q) bits, wherein q is a maximum bit length for local values stored at the n nodes 205. The local values stored at the n nodes 205 do not change during an aggregate statistic computation process, which is described in greater detail later.

Within an operation of the system 200, a certain number of node failures and communication or message failures may occur. However, within an execution of an aggregate statistic computation process, it is assumed that no node failures occur. Message failures are assumed to occur, within the execution of an aggregate statistic computation process, with an expected probability of δ, wherein 1/(log n) <δ<1. Within this defined range, the expected message failure probability δ may be selected by a system analyst (e.g., based on empirical study, based on a "best guess", etc.).

Aggregate Statistic Computation for MAX

An aggregate statistic computation of a maximum local value (hereinafter "MAX") at the n nodes 205 within the system 200 of FIG. 2 will now be described.

Figure 3:
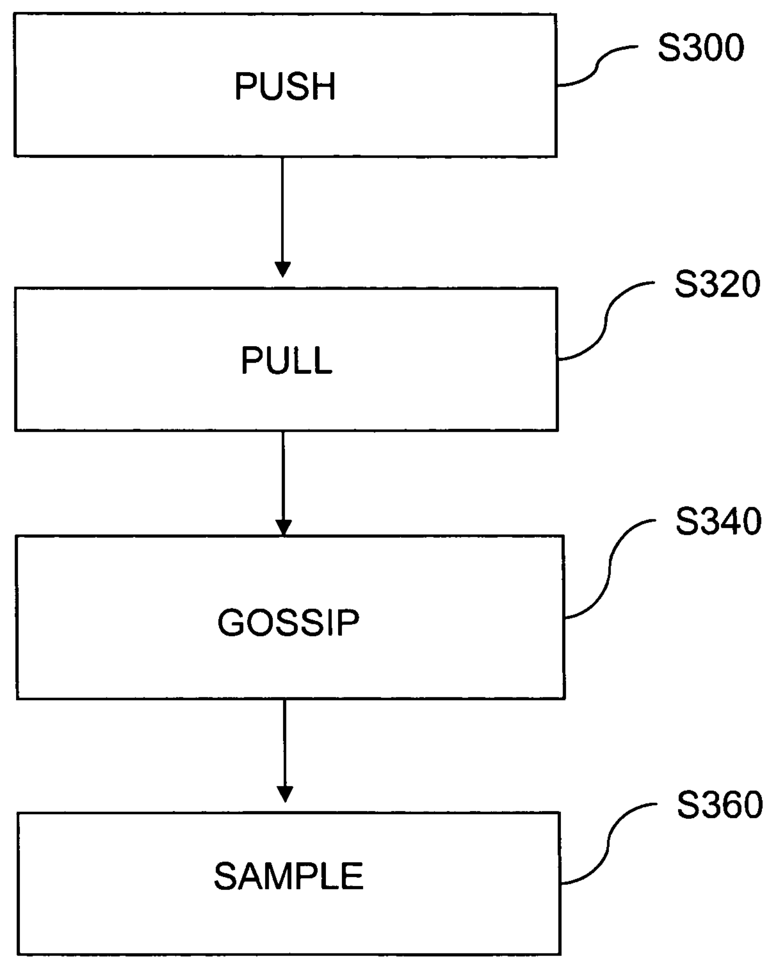
FIG. 3 is a flow chart illustrating a MAX aggregate statistic computation process according to an example embodiment of the present invention.

FIG. 3 is a flow chart illustrating a MAX aggregate statistic computation process according to an example embodiment of the present invention. The MAX computation process of FIG. 3 includes "push" step S300, "pull" step S320, "gossip" step S340 and "sample" step S360. Generally, push and pull steps S300 and S320 relate to a grouping of nodes such that initial "unassigned" nodes are assigned to one of a plurality of groups as either "leader nodes" or "dependent nodes", gossip step S340 relates to information or MAX value sharing among the leader nodes, and sample step S360 relates to a MAX value retrieval for any of the n nodes. Steps S300 through S360 will now be described in greater detail with respect to FIGS. 4 through 10.

Figure 4:
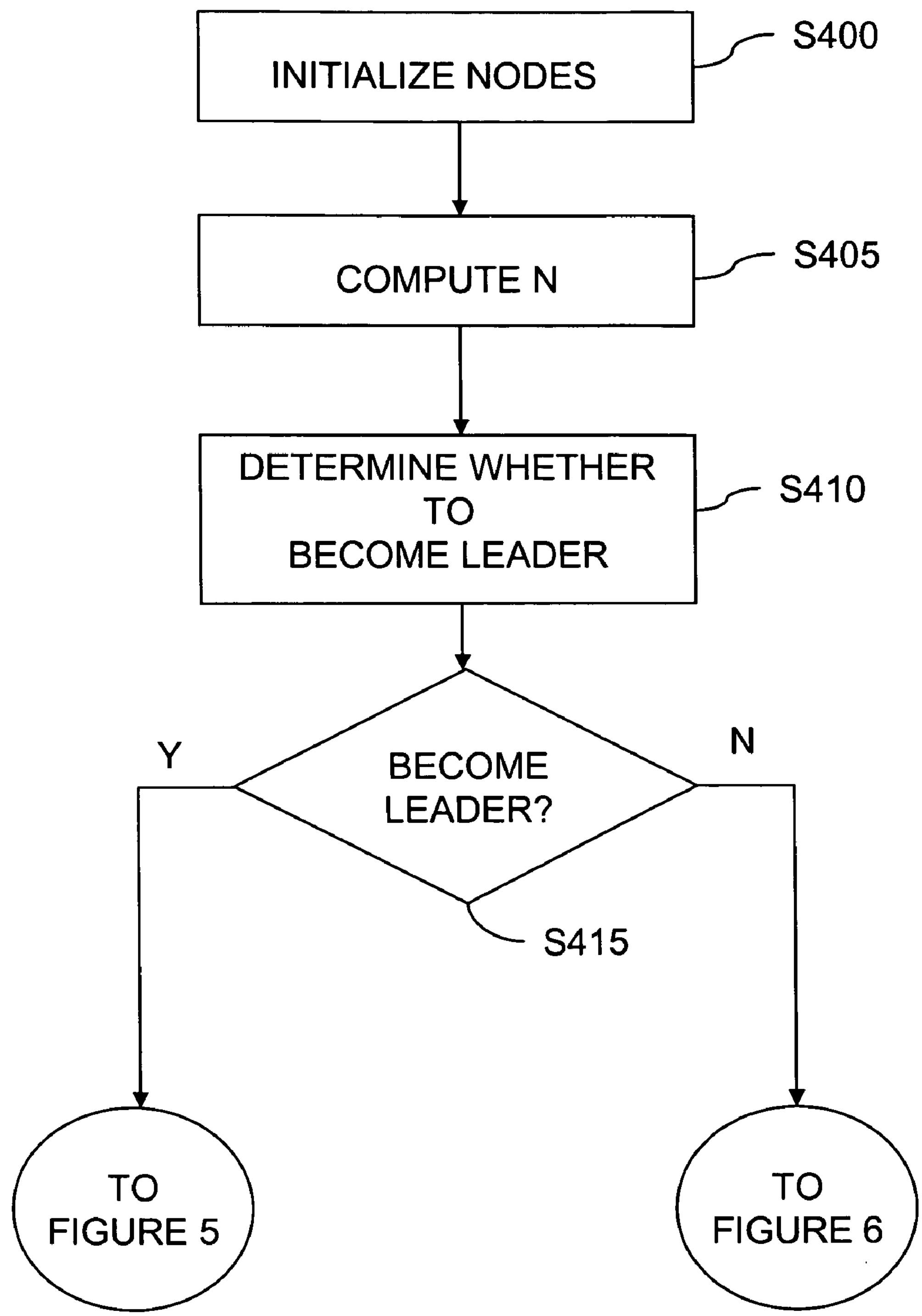
FIG. 4 is a flow chart illustrating a leader node assignment process of a push step of FIG. 3.

FIG. 4 is a flow chart illustrating a leader node assignment process of the push step S300 of FIG. 3. In step S400 of FIG. 4, each of the n nodes 205 within the system 200 are initialized to a default or "unassigned" setting. Hereinafter, an "unassigned" node refers to a node that does not belong to a group. A "group" refers to a set of nodes including one or more dependent nodes and a single leader node.

In step S405 of FIG. 4, each of the n nodes 205 within the system 200 computes a value of "n" (i.e., the number of nodes within the system 200). The computation for the value of n in a communication system such as system 200 is well-known in the art and will not be described further for the sake of brevity.

In step S410 of FIG. 4, each of the n nodes 205 within the system 200 determines whether to assign itself as a leader node. The determining step S410 is performed such that (n/log n) nodes assign themselves as leader nodes. Thus, because there are n total nodes in system 200, a probability of one of the n nodes 205 assigning itself as a leader node is (1/log n). Because the determining step S410 is performed separately at the n nodes 205, with each node 205 not having knowledge of leader node assignments of other nodes, a resultant number of nodes assigned as leader nodes may not be exactly equal to (n/log n). For example, the determining step S410 may be performed by having each node 205 generate a random value between 0 and 1, and all nodes generating a random value less than or equal to (1/log n) are assigned as leader nodes. As shown by this example, the resultant number of leader nodes is likely to approximate (n/log n), but outliers among the randomly generated numbers may at least slightly skew the results from a precise (n/log n) number of leader nodes. Accordingly, it will be appreciated that a subset (e.g., less than all) of the n nodes 205 present within the system 200 are designated as "leader nodes", with each leader node being a "leader" for a particular group.

In step S415 of FIG. 4, each node 205 evaluates whether it is assigned as a leader node. Based on the evaluation of step S415, nodes which are assigned as leader nodes advance to the process of FIG. 5, and nodes which remain unassigned advance to the process of FIG. 6.

Figure 5:
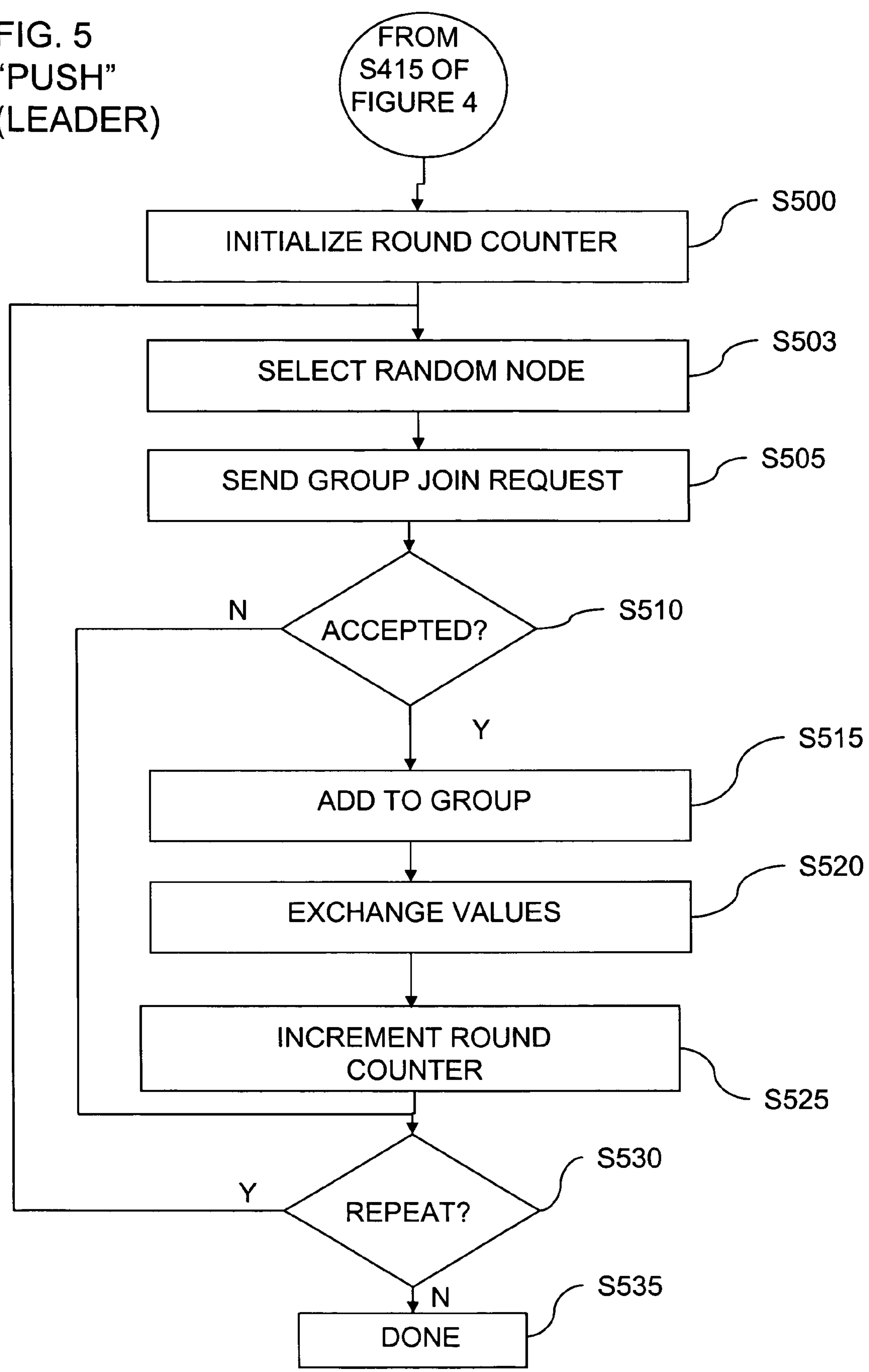
FIG. 5 illustrates leader node grouping operations performed within the push step of FIG. 3.

FIG. 5 illustrates leader node grouping operations performed within push step S300 of FIG. 3. The process of FIG. 5 is performed concurrently at each leader node, assigned during the process of FIG. 4, within the system 200. For simplicity of description, FIG. 5 shall be described as performed at a leader node X of group X.

In step S500, the leader node X initializes a round counter, which indicates a number of rounds, to zero. Each iteration of steps S503 through S530, which will now be described, are performed within a single round.

In step S503 of FIG. 5, the leader node X selects a target node at random from among the n nodes 205 within the system 200. The leader node X may use any well-known random selection process to perform step S500. Next, in step S505, the leader node X sends a join group request to the selected target node. The join group request is a request to join group X as a dependent node to the leader node X.

In step S510, the leader node X waits for a response from the selected target node indicating whether the selected target node accepts the join group request. If the selected target node accepts the join group request, the process advances to step S515; otherwise, the process advances to step S525.

In step S515, if the selected target node indicates an acceptance of the join group request, the leader node X adds the selected target node to group X as a dependent node. In step S520, leader node X and the selected target node exchange local values. For example, the leader node X may send a locally measured temperature to the selected target node and may receive, from the selected target node, a temperature measured at the selected target node.

In step S525, the leader node X increments the round counter by 1. Thus, after a first iteration of steps S505 through S525, the round counter equals 1. In step S530, the leader node X compares the round counter with a push threshold value. The push threshold value represents a number of rounds allocated to the push step S300 of FIG. 3. In an example, the push threshold value equals ((log n) log (log n)).

Accordingly, assuming the push threshold value equals ((log n) log (log n)), it will be appreciated that the process of FIG. 5, when performed at each of the (n/log(n)) leader nodes, includes ((log n) log (log n)) rounds and (n*log(log(n)) messages. If the comparison of step S530 indicates that the incremented round counter is greater than the push threshold value, the process terminates at step S535; otherwise, if the incremented round counter is not greater than the push threshold value, the process returns to step S503.

Figure 6:
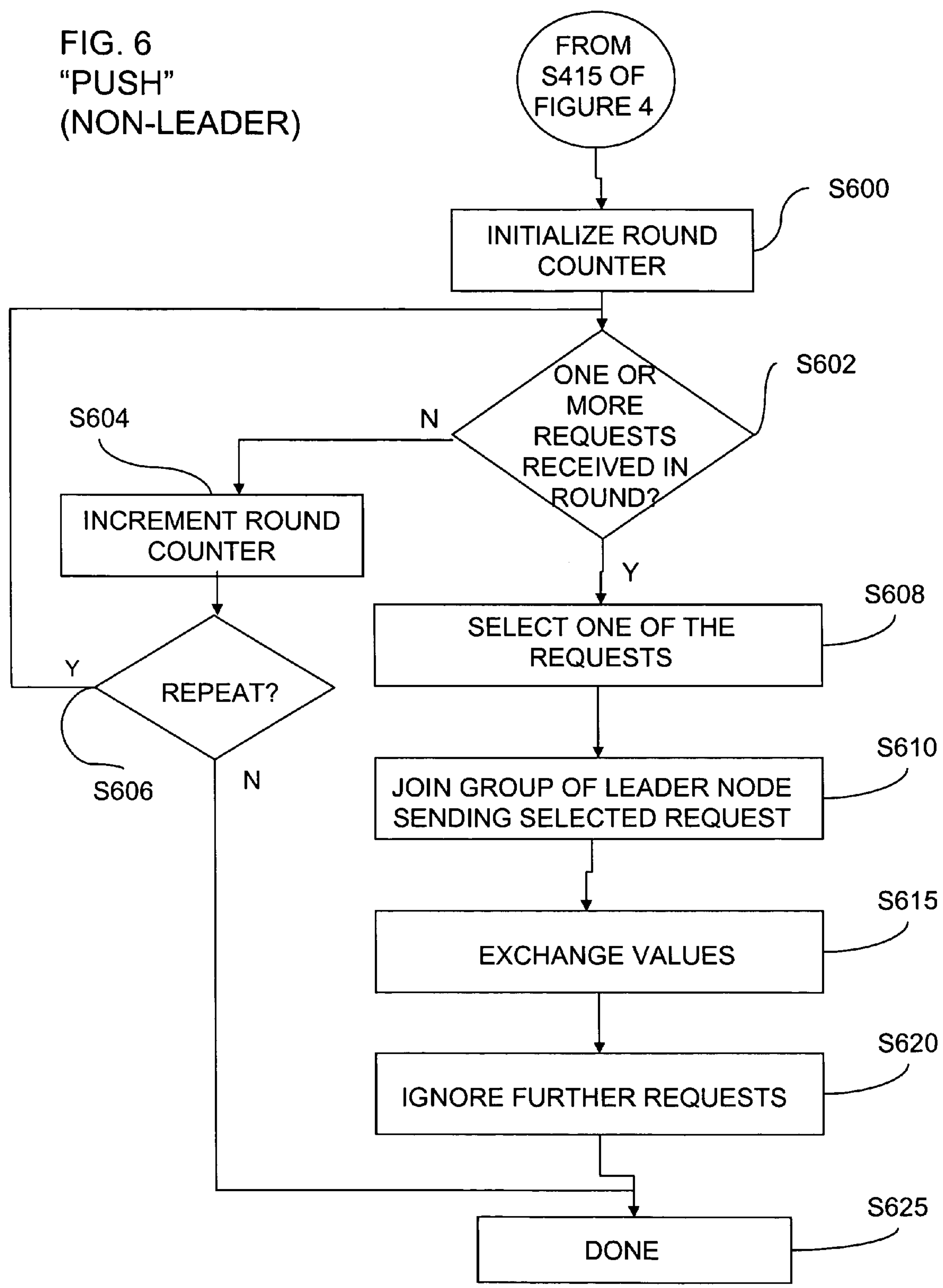
FIG. 6 illustrates unassigned node grouping operations performed within the push step of FIG. 3.

FIG. 6 illustrates unassigned node grouping operations performed within push step S300 of FIG. 3. The process of FIG. 6 is performed concurrently at each unassigned (i.e., not yet assigned as either a dependent node or a leader of a group) node within the system 200. For simplicity of description, FIG. 6 shall be described as performed at an unassigned node Y.

In step S600, the unassigned node Y initializes a round counter, which indicates a number of rounds, to zero. It is assumed that rounds of the process of FIG. 6 correspond to, or are synchronized with, rounds of the process of FIG. 5 as described above.

In step S602 of FIG. 6, the unassigned node Y waits to receive one or more requests to join a group from a given leader node among the n nodes 205 within the system 200 (e.g., sent at step S505 of FIG. 5). If no request is received during the first round, the process proceeds to step S604, where the round counter is incremented. The incremented round counter is compared to the push threshold value (e.g. (log n) log (log n)). If the incremented round counter is greater than the push threshold value, the process terminates at step S625; otherwise, if the incremented round counter is not greater than the push threshold value, the process returns to step S602.

Returning to step S602, if the unassigned node Y receives one or more group join requests, the process advances to step S608. In step S608, the unassigned node Y selects one of the group join requests. In an example, if the unassigned node Y receives a single group join requests in step S602, the received request is automatically selected. In another example, if more than one request is received, the unassigned node Y selects one of the group join requests (e.g., through a random selection process).

In step S610 of FIG. 6, the unassigned node Y becomes dependent node Y by joining the group associated with the selected group join request ("group Y"). In step S615, dependent node Y exchanges its local values with the leader node of group Y ("leader node Y"). For example, the dependent node Y may send a locally measured temperature to the leader node Y and may receive a temperature, measured at the leader node Y, from the leader node Y.

After the local value exchange at step S615 of FIG. 6, the dependent node Y ignores any further group join requests and the process terminates at step S625.

As will be appreciated, a theoretical maximum group size after the push step S300 is (log n (log (log n))). It will be further appreciated that most, but not all, of the n nodes 205 within the system 200 will typically be assigned to a group (e.g., as either a leader node or a dependent node) at the end of push step S300. For example, approximately (n/log n) nodes may remain unassigned after push step S300. The pull step S320 handles any remaining unassigned nodes after the push step S300, as will now be described with respect to FIGS. 7 and 8.

Figure 7:
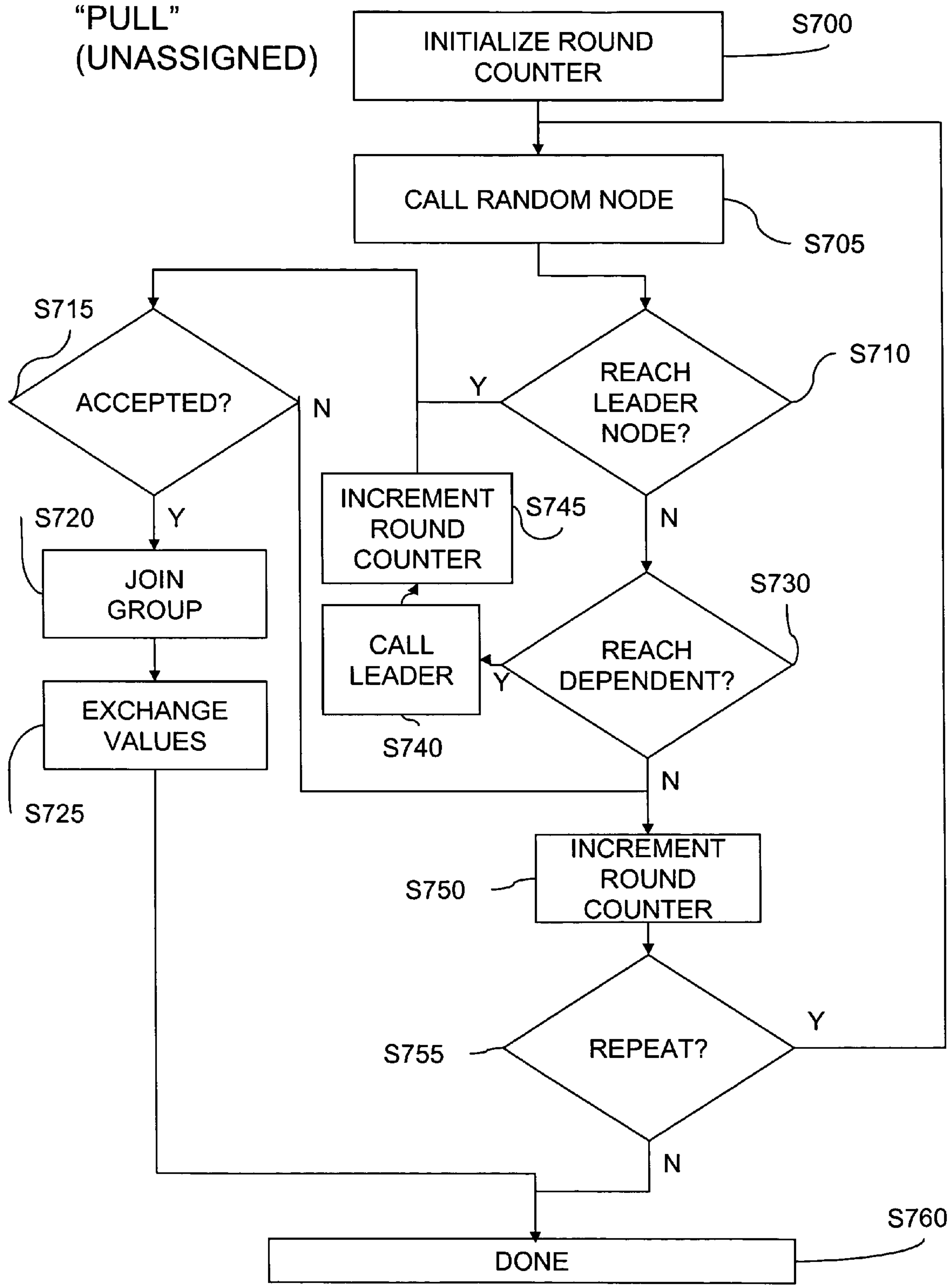
FIG. 7 illustrates unassigned node grouping operations performed within a pull step of FIG. 3.

FIG. 7 illustrates unassigned node grouping operations performed within pull step S320 of FIG. 3. The process of FIG. 7 is performed concurrently at each unassigned (i.e., not yet assigned as either a dependent node or a leader node) node within the system 200 after the push step 300 (i.e., the process of FIGS. 4 through 6). For simplicity of description, FIG. 7 shall be described as performed at an unassigned node Y.

In step S700, the unassigned node Y initializes a round counter, which indicates a number of rounds, to zero. In step S705 of FIG. 7, the unassigned node Y randomly selects and calls one of the n nodes 205. In step S710, the unassigned node Y determines whether the randomly called node is a leader node.

Figure 8:
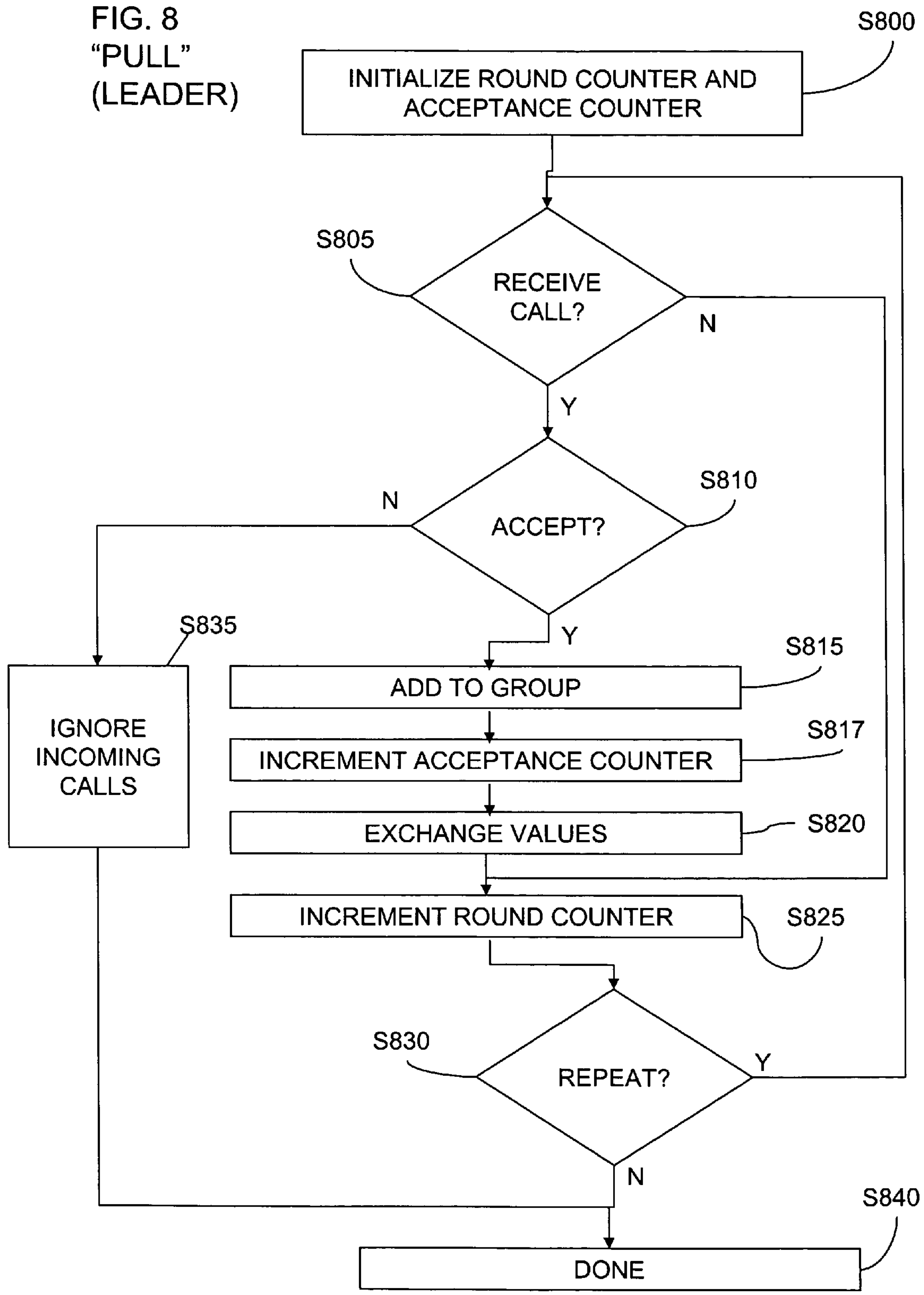
FIG. 8 illustrates leader node grouping operations performed within the pull step of FIG. 3.

If step S710 determines that the randomly called node is a leader node, the unassigned node Y receives an indication, from the contacted leader node, as to whether the unassigned node Y is authorized to join the leader node's group in step S715 (e.g., see step S810 of FIG. 8 for a description of the acceptance determination from the perspective of the contacted leader node). If the unassigned node Y receives authorization to join the leader node's group in step S715, the unassigned node Y joins the leader node's group and becomes a dependent node in step S720, exchanges its local values with the leader node in step S725, and the process terminates at step S760 (e.g., because the unassigned node Y joins the first group at which it is accepted, and afterwards will not switch groups). Otherwise, if the unassigned node Y does not received authorization to join the leader node's group in step S715, the process advances to step S750. In step S750, the round counter is incremented.

In step S755, the unassigned node Y compares the incremented round counter with a pull threshold value. The pull threshold value represents a number of rounds allocated to the pull step S320 of FIG. 3. In an example, the pull threshold value is (log n). Accordingly, assuming the pull threshold value is (log n), it will be appreciated that the process of FIG. 7, includes, at most, (log n) rounds and (n) messages. If the comparison of step S755 indicates that the incremented round counter is greater than the pull threshold value, the process terminates at step S760; otherwise, if the incremented round counter is not greater than the pull threshold value, the process returns to step S705 where a new random node is called to attempt another group join operation.

Returning to step S710, if the randomly called node is not a leader node, the process advances to step S730. In step S730, the unassigned node Y determines whether the randomly called node is a dependent node. If step S730 determines that the randomly called node is not a dependent node (e.g., because the randomly called not is unassigned), the process advances to step S750 (described above). Otherwise, if step S730 determines that the randomly called node is a dependent node, the process advances to step S740. In step S740, the unassigned node Y receives contact information for the leader node of the called dependent node, and uses the received contact information to call the leader node. In step S745, the round counter is incremented. After the round counter is incremented in step S745, the process advances to step S715 (described above).

FIG. 8 illustrates leader node grouping operations performed within pull step S320 of FIG. 3. The process of FIG. 8 is performed concurrently at each leader node within the system 200 after the push step 300 (i.e., the process of FIGS. 4 through 6). For simplicity of description, FIG. 8 shall be described as performed at leader node X.

In step S800, the leader node X initializes a round counter, which indicates a number of rounds, to zero. Also in step S800, the leader node X initializes an acceptance counter, which indicates a number of nodes added to group X during the process of FIG. 8, to zero.

Next, the leader node X waits to receive a call (i.e., a request to join group X from an unassigned node) in step S805. If no requests to join group X are received during a given round, the process advances to step S825. In step S825, the round counter is incremented. In step S830, the incremented round counter is compared to the pull threshold value (e.g., log n). If the comparison of step S830 indicates that the incremented round counter is greater than the pull threshold value, the process terminates at step S840; otherwise, if the incremented round counter is not greater than the pull threshold value, the process returns to step S805.

Returning to step S805 of FIG. 8, if the leader node X receives one or more calls from an unassigned node, the process advances to step S810. In step S810, the leader node X determines whether to accept the requesting unassigned node(s) within group X. For example, if the acceptance counter exceeds an acceptance threshold, the requesting unassigned node(s) are denied acceptance to group X. In an example, the acceptance threshold equals (log (log n)). In another example, if a total number of nodes within group X exceeds a total group size threshold, the requesting unassigned node(s) are denied acceptance to group X. In an example, the total group size threshold equals ((log n) (log (log n))). Otherwise, if the group size and acceptance counter do not exceed the total group size threshold and/or the acceptance threshold, the requesting unassigned node(s) are accepted to group X.

If the leader node denies acceptance to the requesting unassigned node(s) in step S810, the process advances to step S835. In step S835, the leader node X ignores all incoming calls during the pull step S320 until the pull step S320 terminates at step S840. Otherwise, if the leader node accepts the requesting unassigned node(s) in step S810, the process advances to step S815.

In step S815 of FIG. 8, the leader node X adds the requesting unassigned node(s) to group X and informs the requesting unassigned node(s) that they have been accepted to group X. In step S817, the acceptance counter is incremented, as well as a group size counter, which keeps track of the total number of nodes (e.g., both leader node and its dependent nodes) assigned to group X.

In step S820 of FIG. 8, the leader node X and the new dependent nodes exchange their local values (e.g., locally measured temperatures at the respective nodes, etc.). The process then advances to step S830, which was described in greater detail above.

FIGS. 7 and 8 describe the actions of unassigned nodes and leader nodes during the pull step S320 of FIG. 3. However, while not illustrated in FIG. 7 or 8, nodes which become dependent nodes may also participate during the pull step S320. For example, if an unassigned node calls a dependent node during the process of FIG. 7 (e.g., see step S730), the dependent node responds to the call with information identifying its leader node. Likewise, if an unassigned node is called by another unassigned node during the process of FIG. 7 or 8 (e.g., see step S730 of FIG. 7), the called unassigned node informs the calling unassigned node that the called unassigned node is not a member of any group.

Although there is theoretically at least some chance that a few unassigned nodes will remain after the pull step S320 (e.g., the processes of FIGS. 7 and 8), it will hereinafter be assumed that the pull step S320 results in zero unassigned nodes, such that each of the n nodes 205 is a member of a group after the pull step S320.

Figure 9:
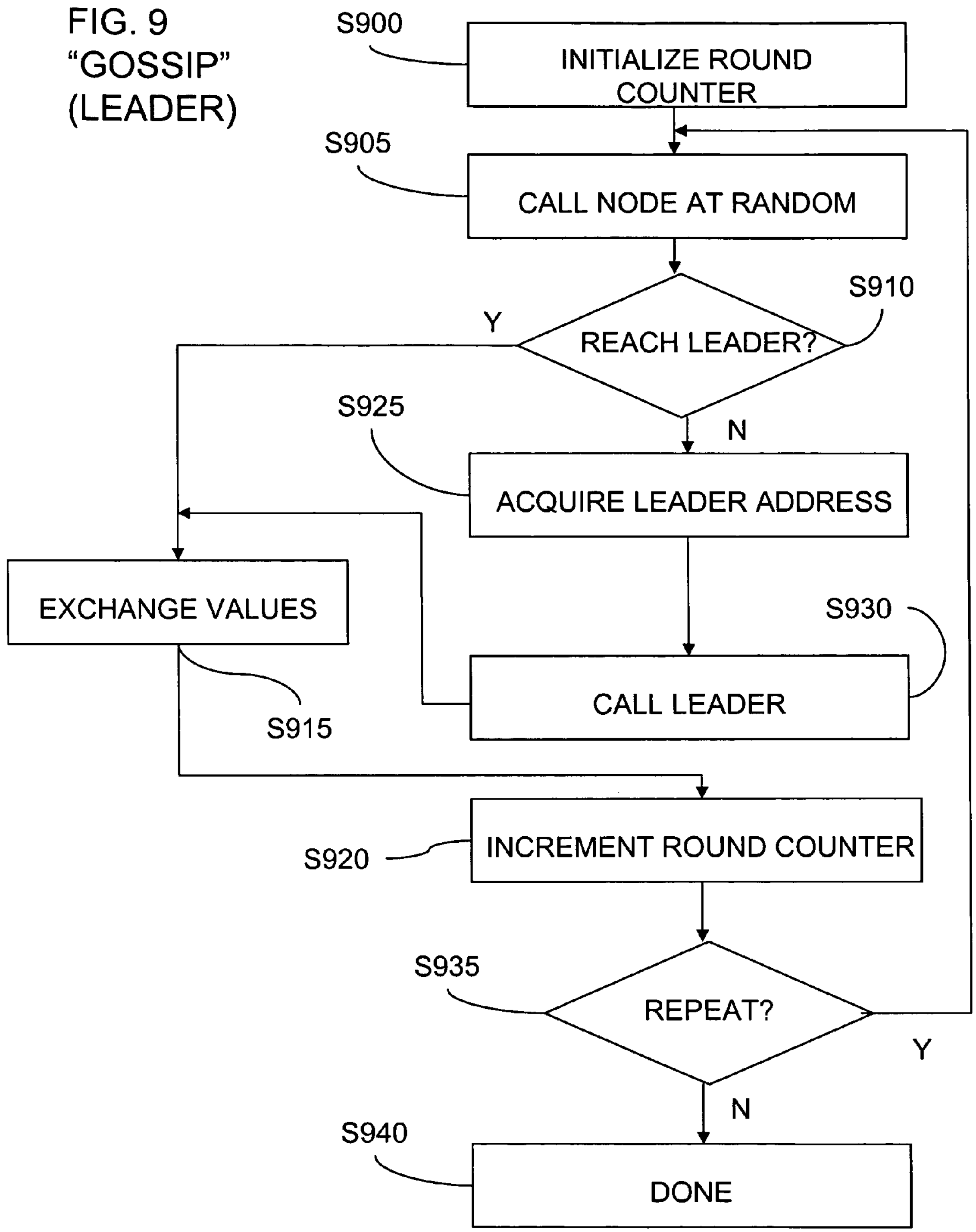
FIG. 9 illustrates leader node "gossip" operations performed within a gossip step of FIG. 3.

FIG. 9 illustrates leader node "gossip" operations performed within gossip step S340 of FIG. 3. The process of FIG. 9 is performed concurrently at each leader node within the system 200 after the pull step 320 (i.e., the process of FIGS. 7 and 8). For simplicity of description, FIG. 9 shall be described as performed at a leader node X.

In step S900, the leader node X initializes a round counter, which indicates a number of rounds, to zero. Next, in step S905 the leader node X randomly selects and calls a node from among the n nodes 205. In step S910, the leader node X determines whether the randomly called node is another leader node ("leader node Y"). If the leader node X determines that the randomly called node is another leader node in step S910, leader nodes X and Y exchange group values (e.g., in the case of a MAX aggregate statistic computation, this would include their highest local values from among the nodes of their respective groups). After the group values are exchanged in step S915, the round counter is incremented in step S920 and the incremented round counter is compared to a gossip threshold value in step S935. In an example, the gossip threshold value equals ((log n) (log (log n))). If the comparison of step S935 indicates that the incremented round counter is greater than the gossip threshold value, the process terminates at step S940; otherwise, if the incremented round counter is not greater than the pull threshold value, the process returns to step S905 where the leader node X calls another randomly selected node.

Returning to step S910 of FIG. 9, if the leader node X does not reach another leader node (e.g., in the random call in step S905), the process advances to step S925. Because it has been assumed that the pull step S320 results in no remaining unassigned nodes, it follows that the leader node X has called a dependent node. Thus, in step S925, the leader node X requests and receives information indicating the leader node of the group to which the called dependent node belongs. In step S930, the leader node for that group is called, and the process advances to step S915, which was described above in greater detail. While not explicitly shown in FIG. 9, step S930 is only performed if the call to the dependent node (e.g., from step S905) does not cause the round counter to exceed the gossip threshold value. These steps have been omitted from FIG. 9 only to reduce the complexity of FIG. 9, but it is understood that, generally, each "call" made by leader node X corresponds to one "round".

Within the gossip step S340 of FIG. 3, which is elaborated within the process of FIG. 9, it may be assumed that group sizes are at most ((log n) (log (log n))) for each group. Because the gossip process of FIG. 9 is bounded to (log n) calls or rounds, the number of nodes, for example, having a MAX aggregate statistic which is representative of the true MAX for all of the n nodes 205, is at least equal to (n/log n (log (log n))). Further, the complexity of the "gossip phase" or step S340 is (log (log (log n))) rounds.

Figure 10:
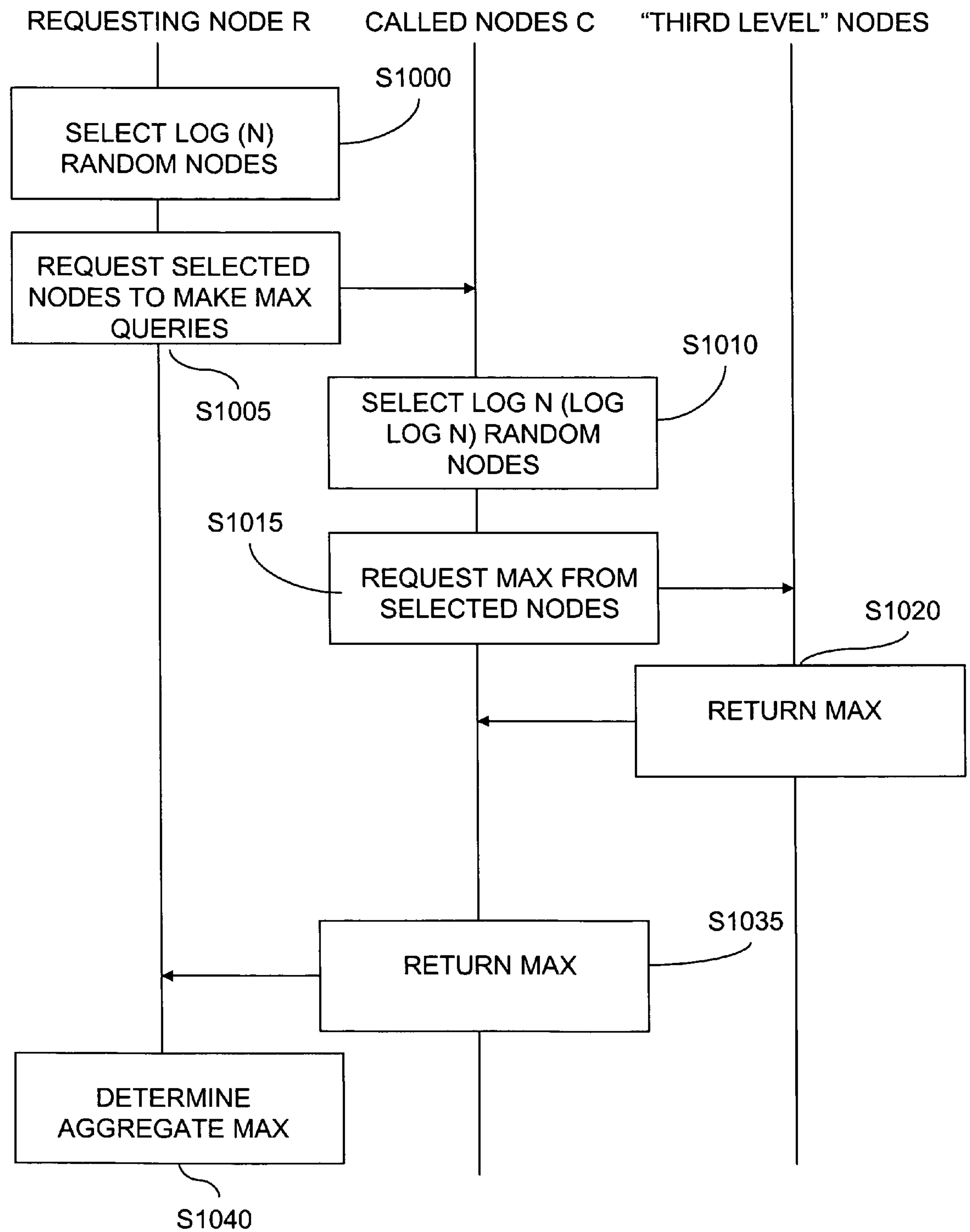
FIG. 10 illustrates sampling operations performed within a sampling step of FIG. 3.

FIG. 10 illustrates sampling operations performed within the sampling step S340 of FIG. 3. The process of FIG. 10 may be performed at any node (e.g., either dependent or leader) within the system 200 after the gossip step 340 (i.e., the process of FIG. 9).

In step S1000 of FIG. 10, assume that a requesting node R wishes to know the MAX aggregate statistic for a given parameter (e.g., temperature, humidity, etc.) from among the n nodes 205 within the system 200. Accordingly, in step S1000, the requesting node R selects (log n) random nodes from among the n nodes 205. Next, in step S1005, the requesting node R calls each of the selected (log n) nodes and requests each called node C to sample or query another (log n (log (log n))) nodes for their MAX values for the given parameter. Thus, in step S1010, each called node C randomly selects (log n (log (log n))) nodes. In step S1015, each called node C calls each of their selected (log n (log (log n))) nodes and requests their MAX values. In step S1020, each called node C receives the MAX values from each of their called (log n (log (log n))) nodes. In step S1035, each node C returns, to the requesting node R, a MAX value equal to the higher of (i) a previously stored local MAX value at each respective node C or (ii) a highest returned MAX value from the called (log n (log (log n))) nodes. In step S1040, the requesting node R determines the MAX value for the system 200 to be the higher of (i) a previously stored local MAX value at the requesting node R and (ii) a highest returned MAX value from each called node C. It will be appreciated that each iteration of the "sampling" process of FIG. 10, under the above assumptions, may include (log n) rounds and (n log (log n)) messages.

Aggregate Statistic Computation for AVERAGE

While FIGS. 3 through 10 have been above-described with respect to a MAX aggregate statistic computation, computations for other aggregate statistics will now be described.

Figure 11:
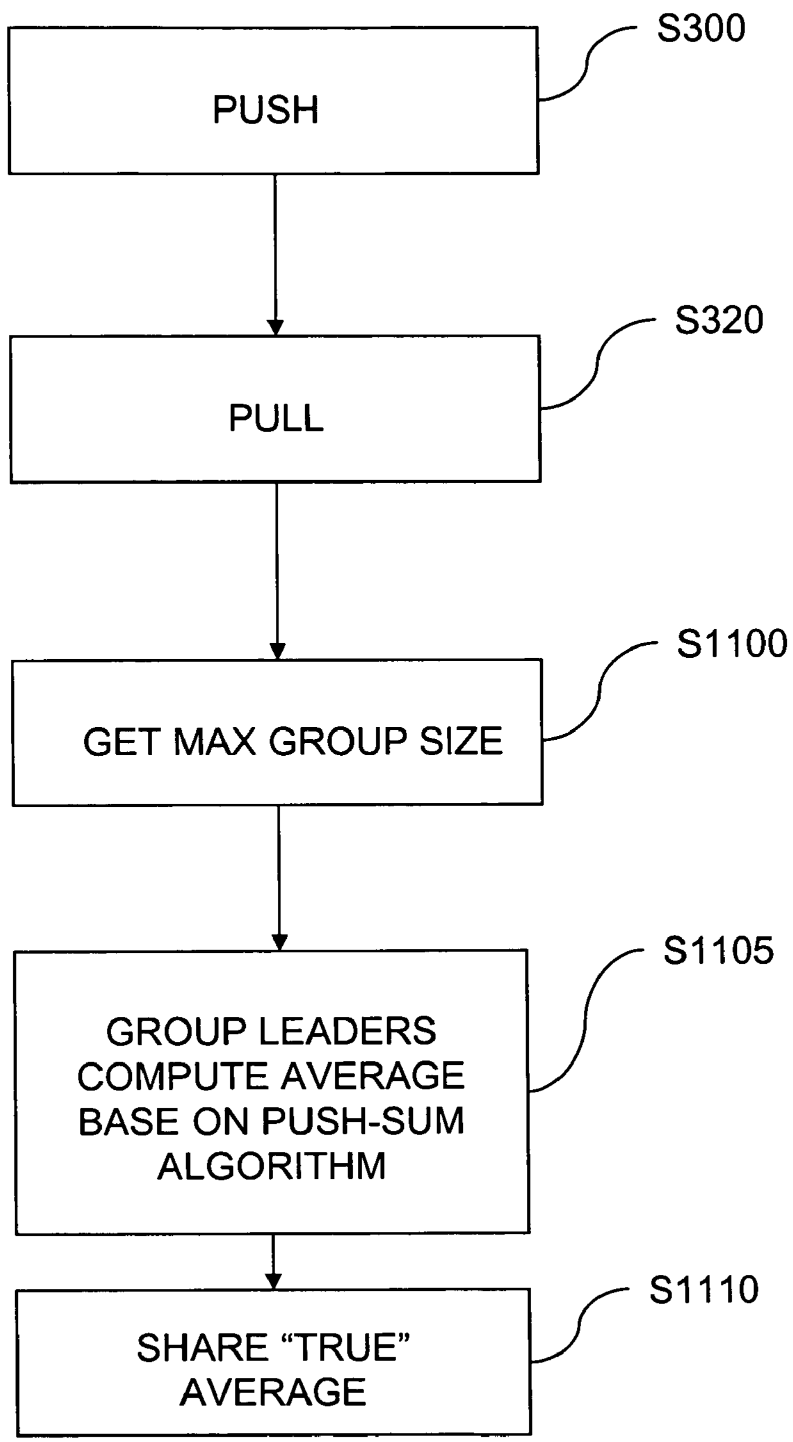
FIG. 11 is a flow chart illustrating an AVERAGE aggregate statistic computation process according to another example embodiment of the present invention.

FIG. 11 is a flow chart illustrating an AVERAGE aggregate statistic computation process according to another example embodiment of the present invention. The AVERAGE aggregate statistic is an average for a given local or group value (e.g., an average temperature measured at the n nodes within system 200, an average group size of groups within the system 200, etc.).

In the example embodiment of FIG. 11, push step S300 and pull step S320 are performed in the same manner as described above with respect to FIGS. 3 through 8. While FIGS. 3 through 8 are described generally to a MAX aggregate statistic computation, the "grouping" operations (e.g., "push" and "pull" steps) may be generic to other aggregate statistic computations as well.

In the example embodiment of FIG. 11, during the push and pull steps S300 and S320, each leader maintains (i) a size of its assigned group and (ii) a sum of local values among the nodes within its group. The leader may obtain and update such information, for example, during the value exchange steps, such as S515, S615, S725 and/or S820.

Next, in step S1100, each leader node within the system 200 performs a MAX aggregate statistic computation in accordance with gossip step S340 and sampling step S360 of FIG. 3. Here, the MAX aggregate statistic collected by the leader nodes is the maximum group size within the system 200.

Once the maximum group size is obtained within step S1100, it will be appreciated that the leader node or nodes having a group size equal to the obtained maximum group size are aware that they are leaders of the largest group. In other words, if the obtained maximum group size equals a locally maintained group size for a given leader node, the given leader node knows that it is the leader of the largest group. Likewise, if the obtained maximum group size does not equal a locally maintained group size for the given leader node, the given leader node knows that it is not the leader of the largest group.

In step S1105, the aggregate average for the local value is computed using the well-known push-sum algorithm. The push-sum algorithm proceeds for log n rounds. In the push-sum algorithm, each node estimates the sum as its own value. In each subsequent round, each node randomly calls another node, and the calling node sends its estimated sum to the called node. At the end of each round, each node updates its estimated average by (i) summing the estimated sums of all the nodes that called it and its own previous estimated sum, and then (ii) dividing the summed value from (i) by 2. At the end of log n rounds, each node has a fairly accurate estimate of the sum of the values at all the nodes. As an example reference, for more information related to the well-known push-sum algorithm, see "Gossip-based computation of aggregate information," In Proceedings of 44th IEEE Conference on Foundations Of Computer Science, pages 482-491, 2003, by D. Kempe, A. Dobra, and J. Gehrke.

In an example, step S1105 may be performed only at leader nodes within the system 200. Thus, each leader node performs push-sum within its group to calculate, for example, a "group average". Because the largest group (e.g., which may be known at the leader node of the largest group) has the most representative group average, this average is assumed to be the "true" average. Accordingly, the "true" average may then be disseminated in step S1110 from the leader node of the largest group to other nodes (e.g., other leader nodes) within the system 200.

Aggregate Statistic Computation for SUM

Figure 12:
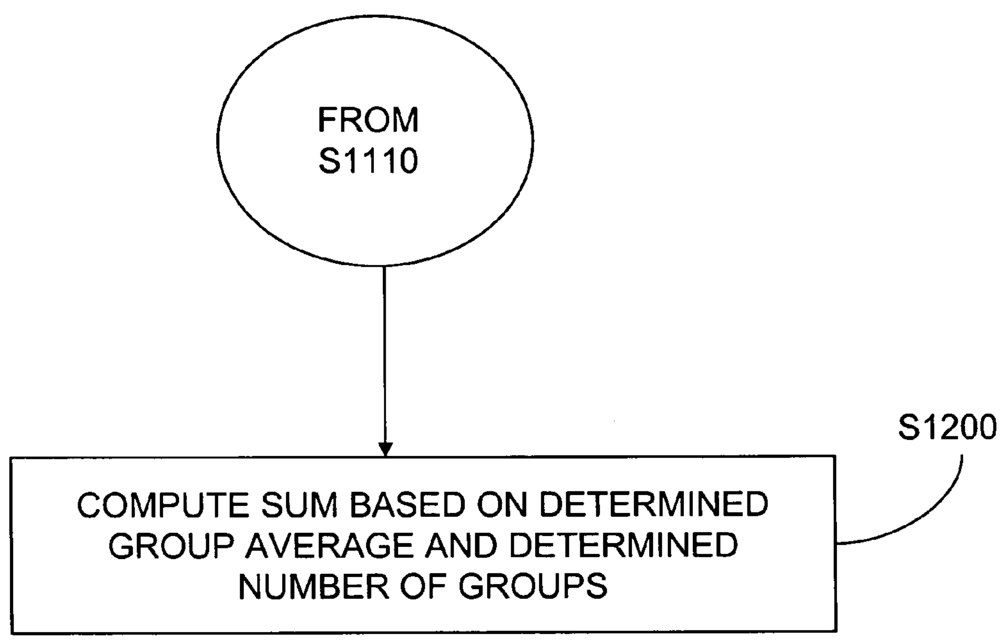
FIG. 12 is a flow chart illustrating a SUM aggregate statistic computation process according to another example embodiment of the present invention.

FIG. 12 is a flow chart illustrating a SUM aggregate statistic computation process according to another example embodiment of the present invention. The SUM aggregate statistic is a sum for a given local or group value (e.g., a summed temperature measured at the n nodes within system 200, etc.) at each node among the n nodes 205 within the system 200.

In the example embodiment of FIG. 12, first, the process of FIG. 11 is performed to determine a group average for a given parameter or local value. For example, assuming the local value for which a sum is sought is temperature, the execution of FIG. 11 will determine the average summed temperature among all groups within the system 200. As discussed above, each leader node maintains both (i) a maximum local value of its group and (ii) the sum of all local values for its group. Thus, the group average may be an average of all (ii) among the groups within system 200.

Next, in step S1200, the obtained group average is multiplied by the total number of groups within the system 200 to arrive at the SUM aggregate statistic. For example, the total number of groups may be obtained by counting the number of leader nodes within the system 200. For example, during a group number calculation, each leader node would return a first logic value (e.g., a binary "1") and each dependent node would return a second logic level (e.g., a binary "0"), with a sum of the first logic values being equal to the total number of groups.

Aggregate Statistic Computation for RANK

Figure 13:
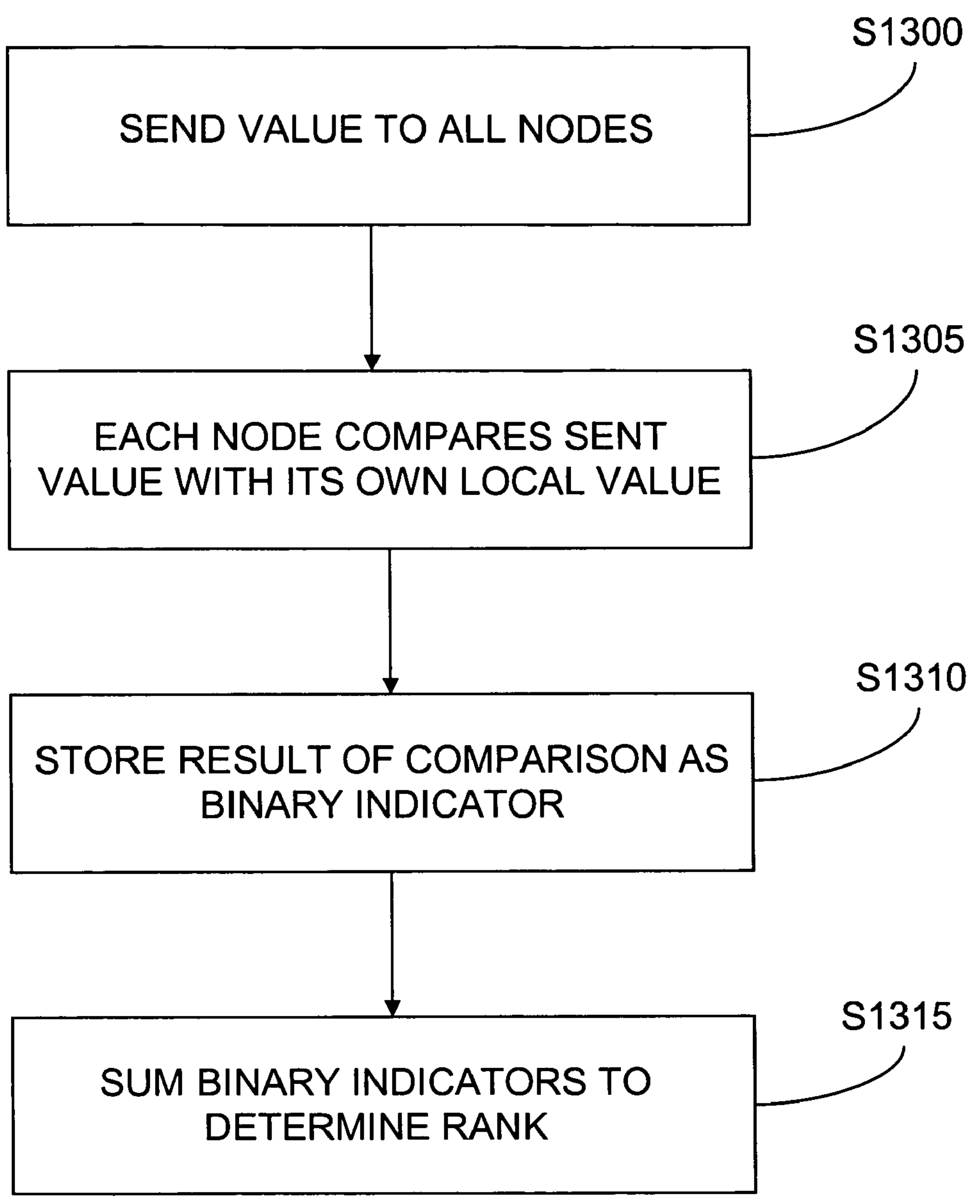
FIG. 13 is a flow chart illustrating a RANK aggregate statistic computation process according to another example embodiment of the present invention.

FIG. 13 is a flow chart illustrating a RANK aggregate statistic computation process according to another example embodiment of the present invention. The RANK aggregate statistic refers to a measure of where a local value for a given node is "ranked" relative to all other nodes within the system 200. Thus, the node with the maximum or highest local value within the system 200 is ranked 0, and the node with the minimum or lowest local value within the system 200 is ranked n−1.

In the example embodiment of FIG. 13, assume a given node among the n nodes 205 of the system 200 desires to know the rank of a given local value compared to all other nodes. Accordingly, in step S1300, the given local value for the given node is disseminated, or spread, from the requesting node to each other node within the system 200. Next, in step S1305, each node receiving the disseminated local value compares the received local value with its own stored local value. The results of the comparison are stored as a binary value in step S1310. For example, if the comparison indicates that the received local value is higher than the stored local value, the binary value equals first logic value (e.g., a binary "1"). Alternatively, if the comparison indicates that the received local value is not higher than the stored local value, the binary value equals the second logic level (e.g., a binary "0"). In step S1315, the aggregate RANK is determined by obtaining the aggregate SUM for the stored binary values (from step S1310) in accordance with the SUM aggregate statistic computation process of FIG. 13.

Example embodiments of the present invention being thus described, it will be obvious that the same may be varied in many ways. For example, while above-described with respect to MAX, MIN, SUM, AVERAGE and/or RANK aggregate statistic computations, it is understood that other example embodiments of the present invention may be directed to obtaining any type of aggregate statistic within a distributed network. Further, the counter thresholds described above are given for example purposes only, and the assumptions with regard to the round efficiency and other criteria are based upon the example conditions set forth above. Accordingly, under different assumptions, it is understood that different performance levels may be achieved in accordance with other example embodiments of the present invention.

Further, it is understood that particular theoretical values for parameters (e.g., log n, log n (log (log n)), etc.) are typically given as approximations, and that it is understood a certain variance may be encountered in real-world implementations of any of the above-processes.

Such variations are not to be regarded as a departure from the example embodiments of the invention, and all such modifications are intended to be included within the scope of the invention.

We claim:

1. A method of grouping nodes within a distributed network, comprising:

performing a leader node self determination operation, without interacting with other nodes within the distributed network, by which each node within the distributed network determines whether to become a leader node or a non-leader node, each leader node being the leader of a group including at least one node;

sending requests, from each leader node, requesting at least one non-leader node to join the group associated with the leader node, the at least one non-leader node initially being unassociated with the leader node sending the requests;

accepting, at each non-leader node, a request from a first requesting leader node, such that accepting non-leader nodes transition from a non-leader node to a dependent node dependent upon the requesting leader node;

sending requests, from each remaining non-leader node, requesting to join the group associated with at least one leader node;

determining, at each requested leader node, whether to accept the non-leader node into the group associated with the requested leader node; and accepting, at each requested leader node, the non-leader node into the group associated with the requested leader node based on the determining step.

2. The method of claim 1, wherein the leader node self determination operation comprises:

determining, at each of the nodes within the distributed network, whether to transition to a leader node such that each node within the distributed has a probability (1/log n) of becoming a leader node, where n is a total number of nodes within the distributed network; and transitioning approximately (n/log n) of the n nodes into leader nodes.

3. The method of claim 1, wherein the sending step performed at each leader node comprises:

selecting one of a plurality of nodes within the distributed network; and sending a group join request requesting the selected node to join an associated group.

4. The method of claim 3, wherein the sending step performed at each leader node further comprises:

repeating the selecting and sending a group join request steps until a number of iterations of the selecting and sending a group join request steps exceeds a threshold.

5. The method of claim 4, wherein the leader node and the selected node exchange data if the selected node accepts the group join request.

6. The method of claim 3, wherein the selecting step randomly selects one of the plurality of nodes.

7. The method of claim 1, wherein transitioning from a non-leader node to a dependent node includes exchanging data between the dependent node and the associated leader node.

8. The method of claim 1, wherein the accepting step performed at each non-leader node accepts the request from the first requesting leader node if the request is received within a time threshold.

9. The method of claim 8, wherein the time threshold is a given number of rounds, each round being a synchronized interval within which leader nodes send a single request to join the group of the leader node.

10. The method of claim 1, wherein sending step performed by each remaining non-leader node comprises:

selecting one of a plurality of nodes within the distributed network;

determining whether the selected node is a leader node;

sending a group join request to the selected node if the determining step indicates that the selected node is a leader node; and receiving contact information for a leader node of the group associated with the selected node if the determining step indicates that the selected node is not a leader node.

11. The method of claim 10, wherein sending step performed by each remaining non-leader node further comprises:

repeating the selecting, determining, sending a group join request and receiving steps until either (i) a leader node accepts the group join request or (ii) the number of iterations of the selecting, determining, sending a group join request and receiving steps exceeds a threshold.

12. The method of claim 10, wherein sending step performed by each remaining non-leader node further comprises:

repeating the sending a group join request step for the leader node of the group associated with the selected node if the determining step indicates that the selected node is not a leader node.

13. The method of claim 1, wherein the determining step determines to accept the non-leader node into the group associated with the requested leader node if (i) a number of nodes within the group associated with the requested leader node does not exceed a first threshold or (ii) a number of nodes joining the group associated with the requested leader node in response to requests sent by the remaining non-leader nodes does not exceed a second threshold.

14. The method of claim 1, further comprising:

performing an aggregate statistic computation, the leader nodes configured to operate in accordance with a first set of protocols during the aggregate statistic computation and the dependent nodes configured to operate in accordance with a second set of protocols during the aggregate statistic computation.

15. The method of claim 14, wherein the aggregate statistic computation is based upon local data of a given data type stored independently at each of the nodes within the distributed network.

16. The method of claim 15, wherein the aggregate statistic computation is one of (i) calculating a maximum of the local data among all of the nodes within the distributed network, (ii) calculating a sum of the local data among all of the nodes within the distributed network, (iii) calculating an average of the local data among all of the nodes within the distributed network, (iv) calculating a group average of the local data among all of the groups within the distributed network, (v) calculating a rank of the local data among all of the nodes within the distributed network and (vi) calculating a minimum of the local data among all of the nodes within the distributed network.

* * * * *